United States Patent [19]

Green

[11] 4,295,326

[45] Oct. 20, 1981

[54] SELF-PROPELLED FLAIL BLADE LAWN MOWER

[75] Inventor: Douglas F. Green, Brisbane, Australia

[73] Assignee: Royer Mowers (Aust.) Pty. Ltd., Brisbane, Australia

[21] Appl. No.: 129,092

[22] Filed: Mar. 10, 1980

[30] Foreign Application Priority Data

Nov. 4, 1977 [AU] Australia .............................. PD2313

[51] Int. Cl.³ .......................................... A01D 50/02
[52] U.S. Cl. .................................... 56/11.3; 56/11.6; 56/11.8; 56/12.7
[58] Field of Search ..................... 56/11.3, 11.6, 11.8, 56/12.7, 16.7

[56] References Cited

U.S. PATENT DOCUMENTS

| | | | |
|---|---|---|---|
| 2,696,889 | 12/1954 | Mott | 56/11.6 |
| 2,697,904 | 12/1954 | Goudie | 56/11.6 |
| 2,861,411 | 11/1958 | Shock | 56/11.6 |
| 3,014,546 | 12/1961 | Banka | 56/11.8 |
| 3,570,637 | 3/1971 | Pitman et al. | 56/11.3 |
| 3,998,034 | 12/1976 | Rubin | 56/11.8 |
| 4,159,614 | 7/1979 | Thomas et al. | 56/11.8 |

FOREIGN PATENT DOCUMENTS 111727 10/1939 Australia .............................. 56/11.8

Primary Examiner—Jay N. Eskovitz
Attorney, Agent, or Firm—Mahoney & Schick

[57] ABSTRACT

A self-propelled flail blade lawn mower comprising a support frame having forward and rearward ends, a handle assembly extending upwardly and rearwardly from said rearward end and a cutter housing extending forwardly of said forward end, a rear axle and wheel assembly rotatably supported substantially in the vicinity of the rearward end of said support frame and a pair of front wheels rotatably mounted substantially in the vicinity of the forward end of said cutter housing, a cutter shaft bearing a plurality of pivotally mounted flail blades rotatably supported within said cutter housing a motor and a transmission box mounted on said support frame, said motor having an output shaft and said transmission box having input and output shafts, first drive means operatively connected between said transmission box output shaft and said rear axle and wheel assembly, second drive means connectable between said motor output shaft and said transmission box input shaft in response to the movement of a first lever mounted on said handle assembly, third drive means connectable between said motor output shaft and said cutter shaft in response to the movement in one direction of a second lever mounted on said cutter housing and brake means operable to prevent rotation of said cutter shaft in response to the movement of said second lever in a direction opposite to said one direction.

6 Claims, 3 Drawing Figures

SELF-PROPELLED FLAIL BLADE LAWN MOWER

BACKGROUND OF THE INVENTION

This invention relates to a self-propelled flail blade lawn mower having disengagable propulsion and cutter drive, both of which are operable from a common drive motor.

Flail blade lawn mowers of known construction generally include a horizontal cutter shaft to which is pivotally attached a plurality of longitudinally and radially spaced apart flail blades. The outer end of each flail blade terminates in a fork which constitutes the cutting edge of the blade. The flail blades are pivotally attached to the cutter shaft so that they are caused to extend outwardly therefrom under the influence of the centrifugal force created by the rotation of the cutter shaft. The pivotal attachment of the flail blades to the cutter shaft also establishes a resilience in the flail blades to obstructions which may be encountered during a mowing operation (for example, ground undulations, stones, etc.).

The present invention provides a self-propelled flail blade lawn mower which exhibits the combination of features, not previously taught by the known prior art, of a seperately engagable drive system from a common drive motor to both the self-propulsion mechanism and the cutter shaft, as well as a braking system for the cutter shaft when the latter is disengaged from the drive motor.

SUMMARY OF THE INVENTION

Accordingly, the present invention incorporates as its essential features a self-propelled flail blade lawn mower comprising a support frame having forward and rearward ends, a handle assembly extending upwardly and rearwardly from said rearward end and a cutter housing extending forwardly of said forward end, a rear axle and wheel assembly rotatably supported substantially in the vicinity of the rearward end of said support frame and a pair of front wheels rotatably mounted substantially in the vicinity of the forward end of said cutter housing, a cutter shaft bearing a plurality of pivotally mounted flail blades rotatably supported within said cutter housing a motor and a transmission box mounted on said support frame, said motor having an output shaft and said transmission box having input and output shafts, first drive means operatively connected between said transmission box output shaft and said rear axle and wheel assembly, second drive means connectable between said motor output shaft and said transmission box input shaft in response to the movement of a first lever mounted on said handle assembly, third drive means connectable between said motor output shaft and said cutter shaft in response to the movement in one direction of a second lever mounted on said cutter housing and brake means operable to prevent rotation of said cutter shaft in response to the movement of said second lever in a direction opposite to said one direction.

BRIEF DESCRIPTION OF THE DRAWINGS

A preferred embodiment of the present invention will now be described with reference to the accompanying drawings in which.

DESCRIPTION OF THE BEST EMBODIMENT CONTEMPLATED

Figure 1:
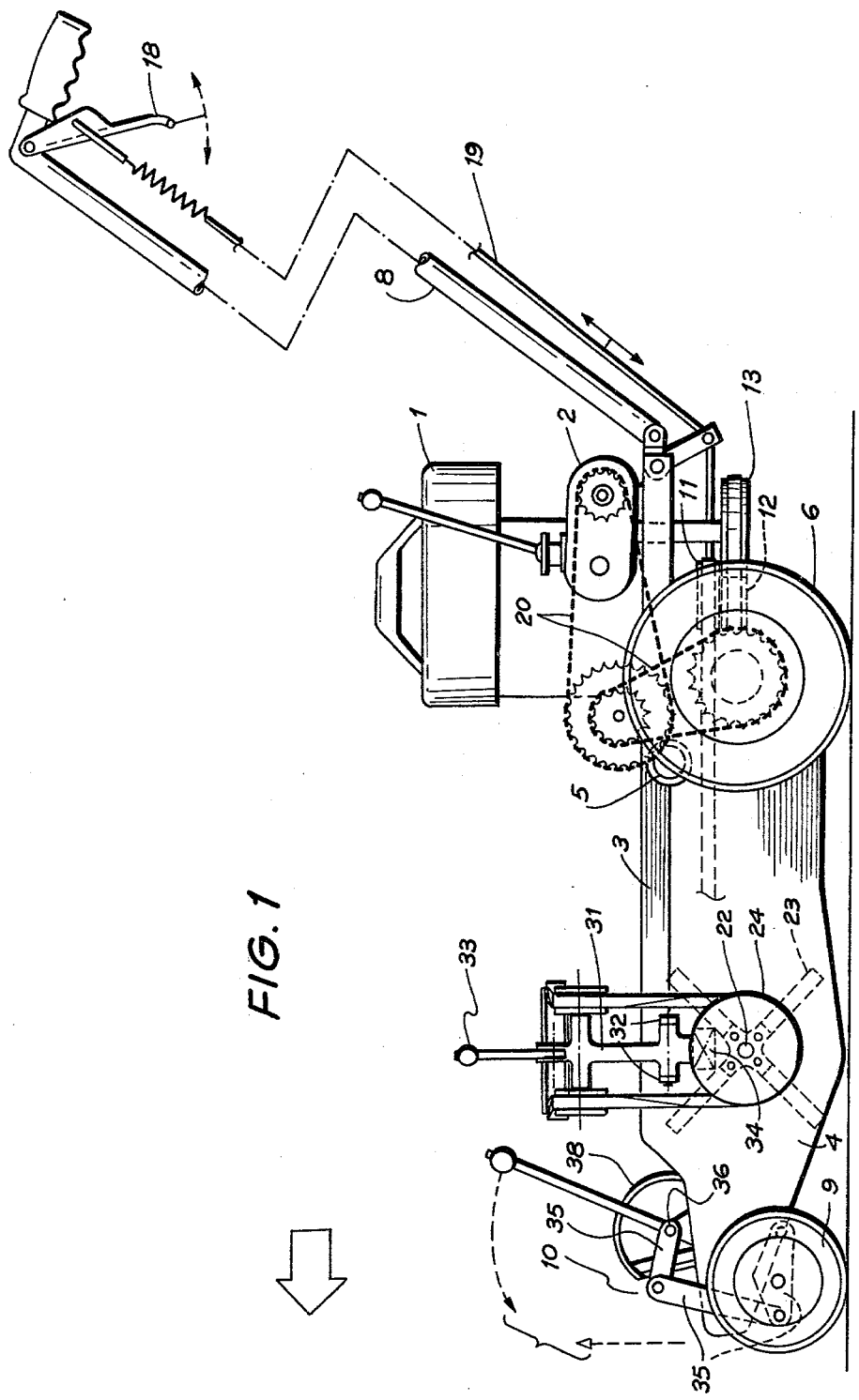
FIG. 1 is a side view of a self-propelled flail blade lawn mower according to the present invention.
Figure 2:
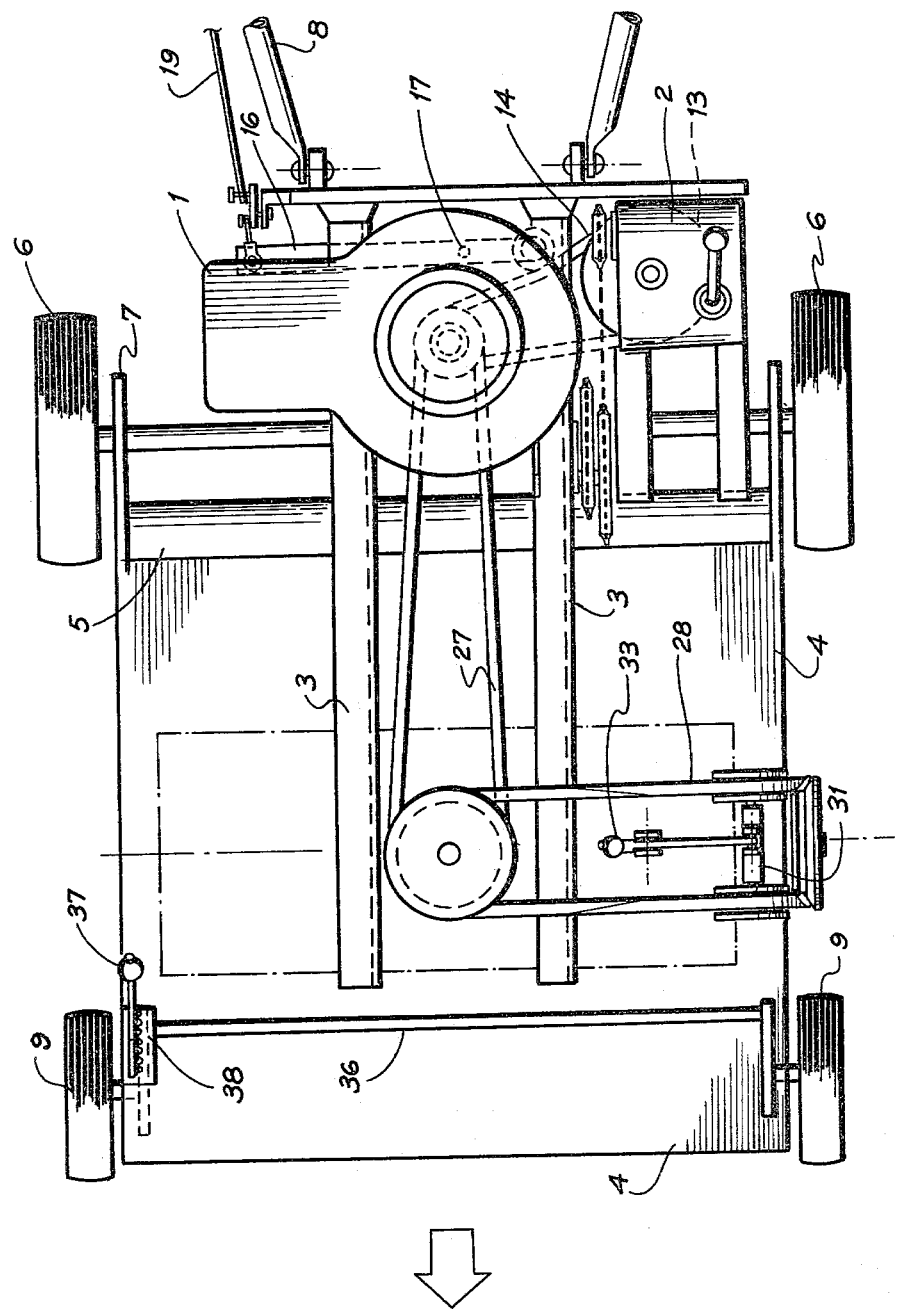
FIG. 2 is a plan view of the lawn mower of FIG. 1.
Figure 3:
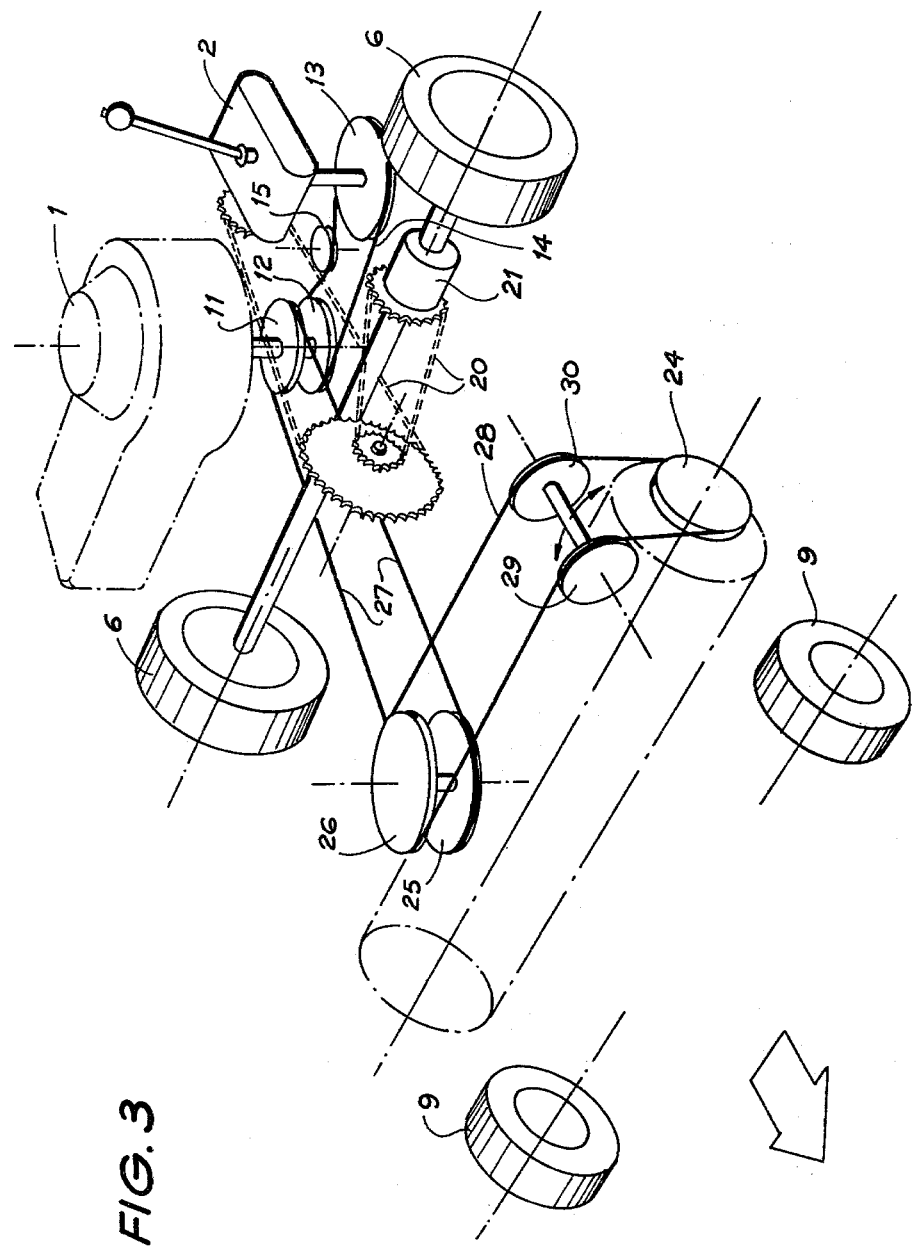
FIG. 3 is an exploded perspective view showing only the self-propulsion and cutter drive mechanism of the lawn mower of FIGS. 1 and 2.

Referring generally to the drawings, a self-propelled flail blade lawn mower according to the present invention includes a drive motor 1 having a substantially downwardly extending drive shaft, a transmission box 2, a support frame 3 and a cutter housing 4. The motor and the transmission box are mounted on the support frame, and the support frame and the cutter housing are each affixed to a common cross member 5 extending transversely across the mower assembly so that the cross member supports the support frame and the rearward end of the cutter housing.

A rear axle and wheel assembly 6 is supported by a pair of brackets 7 connected to and extending downwardly and rearwardly from each end of the cross member 5. A handle assembly 8 is affixed to the support frame and extends upwardly and rearwardly therefrom. Two front wheels 9 are pivotally mounted forwardly and at each side of the cutter housing by means of an adjustment mechanism 10 which enables the forward end of the mower to be raised and lowered in accordance with user requirements.

As mentioned, the drive motor is mounted on the support frame so that its output shaft extends substantially downwardly. An upper pulley 11 and a lower pulley 12 are affixed coaxially to the drive motor output shaft. The transmission box is also mounted on the support frame so that its input shaft extends substantially downwardly and a pulley 13 is affixed thereto so as to operatively align with the lower pulley 12 of the two motor output shaft pulleys. A V-belt 14 passes around the lower motor output shaft pulley 12 and the transmission box input shaft pulley 13. A jockey pulley 15 is rotatably attached to one end of an arm 16 which is pivotally connected to the support frame at pivot point 17 so that, dependent upon the pivotal position of the arm, the jockey pulley exerts a variable force on V-belt 14 so as to vary the tension thereof and thereby effect engagement or disengagement between the drive motor output shaft and the transmission box input shaft.

The tensioning effect of jockey pulley 15 on V-belt 14 is varied by the pivotal movement of arm 16 in response to the movement of a lever 18 mounted on handle assembly 8 and connected to the outer end of 16 by means of a control cable 19. This lever and control cable arrangement provides a manual clutch for effecting engagement and disengagement of the mower self-propulsion system, engagement thereof being effective when pressure is maintained on the lever. The output of the transmission box is transferred by means of a chain drive to a conventional differential 21 on the rear axle and, by differential action, to each of the rear wheels.

A cutter shaft 22 carrying a plurality of pivotally attached flail blades 23 is mounted within the cutter housing 4. A cutter shaft pulley 24 is situated on the outside of the cutter housing and is affixed to one end of cutter shaft 22 passing through the side of the cutter housing. Power is transferred from the drive motor output shaft to the cutter shaft pulley by means of a V-belt system. A pair of intermediate pulleys 25 and 26 is affixed, one to each end of a short shaft which passes vertically through a bearing housing mounted on top of the support frame (not shown). A V-belt 27 connects the lower pulley 25 of the two intermediate pulleys with the upper pulley 11 of the two motor output shaft pulleys. Another V-belt 28 passes around the upper pulley 26 of the two intermediate pulleys, over a pair of intermediate jockey pulleys 29 and 30 and around the cutter shaft pulley 24. The pair of intermediate jockey pulleys 29 and 30 is attached to a common arm 31 which is pivotally mounted to the cutter housing by brackets 32 and whose position may be varied in accordance with the movement of a cutter shaft engagement lever 33. Variations in the position of intermediate jockey pulleys 29 and 30 in response to the movement of cutter shaft engagement lever 33 result in corresponding variations in the tension applied to V-belt 28 and the subsequent engagement or disengagement between the cutter shaft pulley 24 and the upper intermediate pulley 26. This in turn results in a corresponding engagement or disengagement between the cutter shaft and the drive motor output shaft.

The cutter shaft engagement lever 33 is also functional to cause engagement or disengagement of a rim brake 34 which is operable against the rim of the cutter shaft pulley 24 to prevent rotation of the cutter shaft 22. When cutter shaft engagement lever 33 is positioned to cause the release of the tension on V-belt 28 and the subsequent disengagement between the cutter shaft and the drive motor output shaft, rim brake 34 is simultaneously brought into engagement with the rim of cutter shaft pulley 24 so as to immediately prevent further rotation of the cutter shaft. Conversely, the rim brake is released from engagement with the rim of the cutter shaft pulley when the cutter shaft engagement lever is positioned to effect engagement between the cutter shaft and the drive motor output shaft.

Because the axes of the intermediate pulleys 25 and 26, the intermediate jockey pulleys 29 and 30 and the cutter shaft pulley 34 are all at right angles to each other, the V-belt 28 passes through twists of 90° between the upper intermediate pulley 26 and the two intermediate jockey pulleys 29 and 30 and between the two intermediate jockey pulleys 29 and 30 and the cutter shaft pulley 24. Belt guards (not shown) are preferably placed around each of the two intermediate jockey pulleys 29 and 30 to prevent V-belt 28 dislodging therefrom when the intermediate jockey pulleys are positioned by the movement of lever 33 such that V-belt 28 is in a low state of tension and the cutter shaft is disengaged from the drive motor output shaft.

The height adjustment mechanism 10 for lowering and raising the front of the mower with respect to the axes of the front wheels 9 comprises a system of levers 35 passing through each side of the cutter housing and connected to each of the front wheel axles. The levers are connected to each respective end of an operating rod 36 which passes across the top of the cover housing and is rotatably mounted thereon. A height adjustment lever 37 is connected near one end of the operating rod 36 and passes through a notched selection gate 38 mounted on the cutter housing. Movement of the height adjustment lever 37 by selected steps through the selection gate 38 causes rotation of the operating rod 36, subsequent operation of the lever system 35 and resultant raising or lowering of the front of the mower with respect to the axes of rotation of the front wheels 9.

The speed of the drive motor may be varied by means of a conventional cable and lever system operable from the mower handle to vary the fuel supply to the motor in known manner. The transmission box may be a conventional gear box arrangement capable of permitting forward and reverse propulsion of the mower at one or more selectable gear ratios.

The foregoing is a description of only one preferred embodiment of the present invention and minor modifications may be made to the arrangement described without departing from the spirit of the invention as a whole. For example, the mower propulsion and cutter drive system described may be quite satisfactorily employed with a conventional cutter mower, rather than specifically a flail blade lawn mower. Furthermore, although the lawn mower described caters for an operator following the mower on foot, the arrangement of the present invention may just as readily be employed in the case of a lawn mower having a handle and seat assembly mounted at the rear thereof for seated operation. In this case, a conventional steering arrangement could be used.

What is claimed is:

1. A self-propelled flail blade lawn mower comprising a support frame having forward and rearward ends, a handle assembly extending upwardly and rearwardly from said rearward end and a cutter housing extending forwardly of said forward end, said support frame and said cutter housing being affixed to a common cross member extending transversely across the support frame whereby the cross member supports the forward end of the support frame and the rearward end of the cutter housing, a rear axle and wheel assembly rotatably supported substantially in the vicinity of the rearward end of said support frame and a pair of front wheels rotatably mounted substantially in the vicinity of the forward end of said cutter housing, a cutter shaft bearing a plurality of pivotally mounted flail blades horizontally and rotatably supported within said cutter housing, said flail blades being adapted for rotation in a vertical plane, a motor and a transmission box mounted on said support frame, said motor having a downwardly extending output shaft and said transmission box having input and output shafts, first drive means operatively connected between said transmission box output shaft and said rear axle and wheel assembly, second drive means connectable between said motor output shaft and said transmission box input shaft in response to the movement of a first lever mounted on said handle assembly, third drive means connectable between said motor output shaft and said cutter shaft in response to the movement in one direction of a second lever mounted on said cutter housing, and brake means operable to prevent rotation of said cutter shaft in response to the movement of said second lever in a direction opposite to said one direction.

2. A self-propelled flail blade lawn mower as claimed in claim 1 wherein said first drive means comprises a differential mounted on said rear axle and wheel assembly and a chain drive operatively connecting said differential to said transmission box output shaft.

3. A self-propelled flail blade lawn mower as claimed in claim 1 wherein said second drive means comprises a first pulley coaxially affixed to said transmission box input shaft, a second pulley coaxially affixed to said motor output shaft, a V-belt passing around said first and second pulleys and a jockey pulley actuable in response to the movement of said first lever means to engage and establish tension in said V-belt and to thereby cause engagement between said transmission box input shaft and said motor output shaft.

4. A self-propelled flail blade lawn mower as claimed in claim 1 wherein said third drive means comprises a first pulley coaxially affixed to said motor output shaft, second and third pulleys coaxially affixed to a common shaft rotatably mounted on said cutter housing, a fourth pulley coaxially affixed to one end of said cutter shaft, a first V-belt passing in a constant state of tension around said first and second pulleys, a second V-belt passing around said third and fourth pulleys and a pair of jockey pulleys rotatably mounted substantially at each end of a common shaft actuable in response to said movement in one direction of said second lever to engage said second V-belt at corresponding sides thereof between said third and fourth pulleys and to apply tension thereto so as to thereby maintain engagement between said motor output shaft and said cutter shaft.

5. A self-propelled flail blade lawn mower as claimed in claim 4 wherein said bracket means comprises a rim pad operable to engage the rim of said fourth pulley in response to the movement of said second lever in said direction opposite to said one direction.

6. A self-propelled flail blade lawn mower as claimed in claim 1 including a height adjustment mechanism operably connected for raising and lowering said cutter housing with respect to said pair of front wheels.

* * * * *